May 2, 1933. A. C. LINDGREN 1,906,473
GROUND WHEEL FOR HARVESTERS
Filed Oct. 30, 1931 2 Sheets-Sheet 2
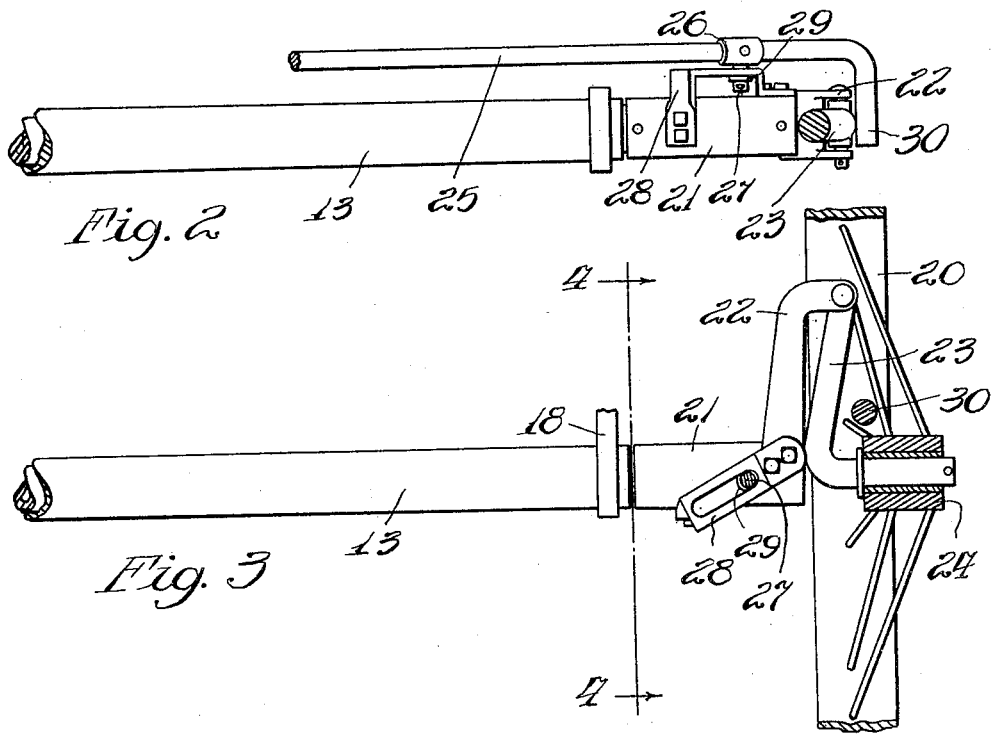
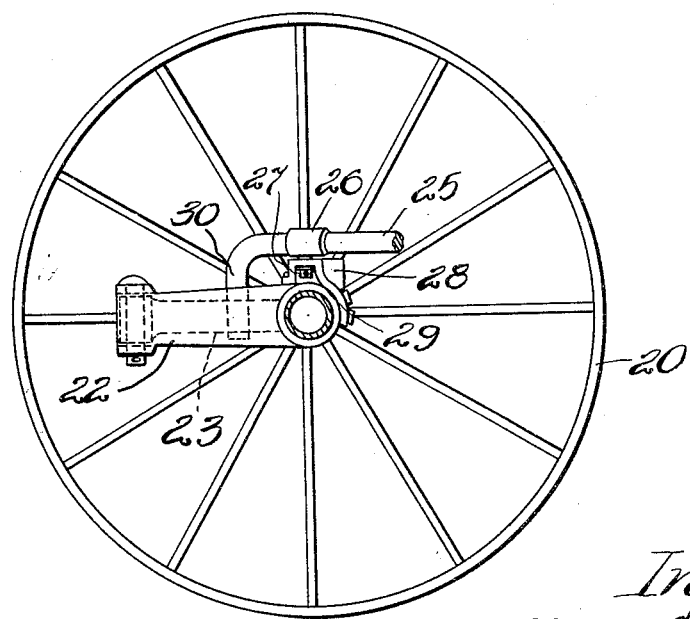
Inventor
Alexus C. Lindgren
By H.P. Loomis
Atty.

Patented May 2, 1933

1,906,473

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

GROUND WHEEL FOR HARVESTERS

Application filed October 30, 1931. Serial No. 572,019.

This invention relates to harvester-threshers and particularly to a combined grain and transport wheel for such machines.

As is well known in the art relating to harvester-threshers, these machines usually comprise a rigid main frame carried on an axle and a pair of wheels, which frame supports the grain separating mechanism on the thresher. Laterally offset from the main frame is the harvester part of the machine which includes a supporting axle hingedly and foldingly connected to the main frame or to the axle thereof. This harvester axle is hingedly connected on a longitudinal axis for movement of the harvester in a vertical plane to accommodate the irregularities in the field. Usually the harvester part is also foldingly connected to the main frame so that it may be swung back in a horizontal plane for the purpose of narrowing materially the width of the machine so that it may more easily be transported through gateways and along narrow highways.

It is quite common at the present time to provide harvester threshers with the folding feature above referred to. The present invention contemplates an improvement in a thresher of this type, the principal object being to provide an improved grain and transport wheel.

Another principal object is to provide a mounting for the grain and transport wheel which will permit pivoting or limited swiveling movement of the wheel when the machine is moving forwardly with the harvester in operative position and when the harvester is in trailing position and to provide means for locking the wheel against pivoting movement when the machine is being moved rearwardly with the harvester in extended operative position.

Another object is to provide draft actuated means automatically operable to lock the grain wheel against pivoting movement when the harvester is being moved rearwardly.

Other objects will be apparent from the drawings and the detailed description to follow.

A preferred form of device in which the invention is embodied and by which the objects of the invention are attained, is shown in the drawings, in which:

Figure 2 is an enlarged detail elevational view partly in section, showing the locking means for the grain and transport wheel.

Figure 3 is a sectional view taken on the line 3—3 of Figure 2; and

Figure 4 is a section taken on the line 4—4 of Figure 3.

Figure 1:
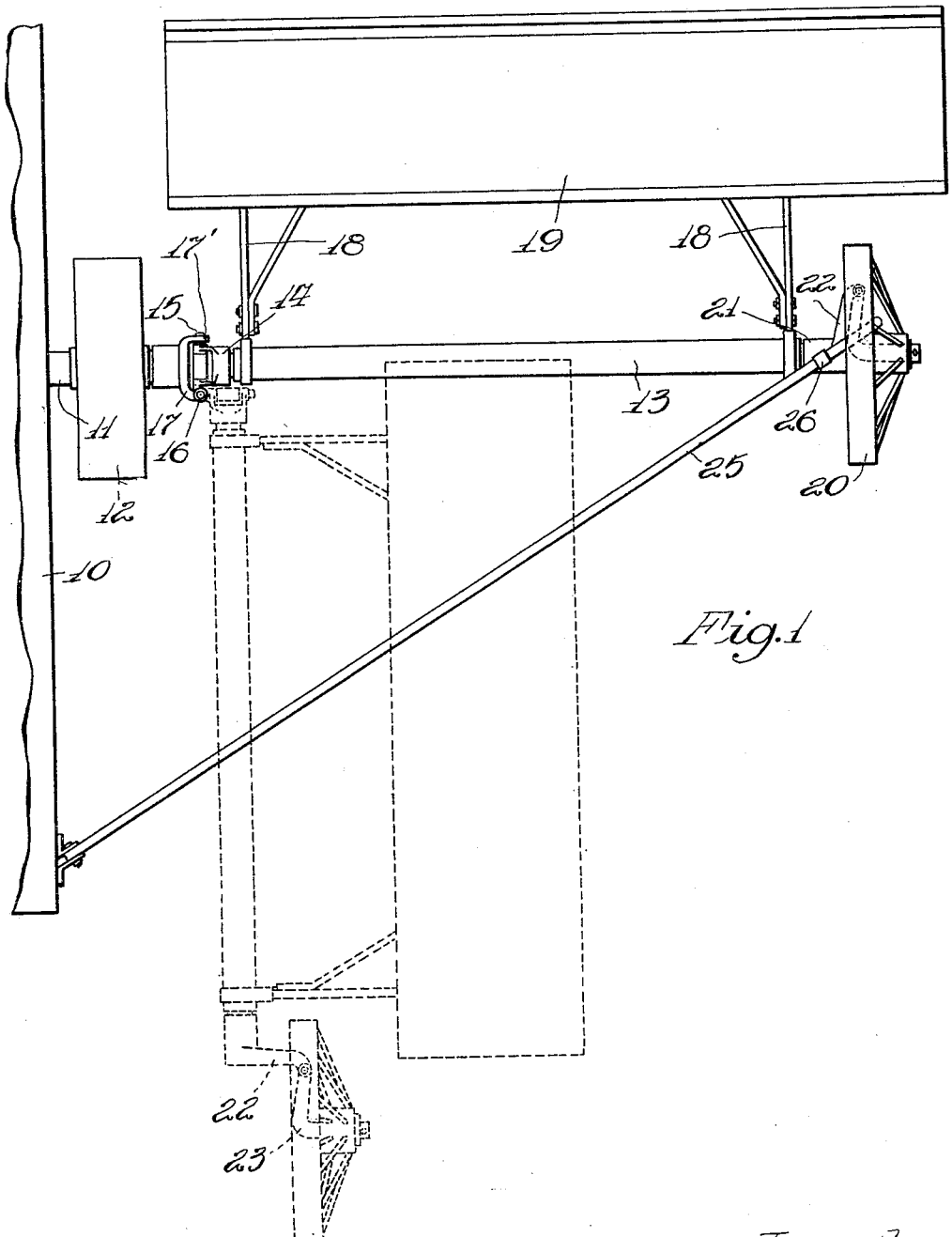
Figure 1 is a plan view showing a fragment of a horizontal thresher main frame with a harvester part hingedly and foldingly connected thereto in combination with a grain and transport wheel embodying the invention. The dotted lines in Figure 1 show the harvester part of the machine in transport position.

Only a fragment of the thresher part of the machine has been illustrated as such machines are well known in the art. The part of the harvester thresher main frame shown is indicated by the numeral 10 and it will be seen that the same is supported on the thresher axle 11 on which a supporting wheel 12 is rotatably mounted. Extending laterally and substantially in line with the thresher axle 11, the thresher frame has connected thereto an axle 13 which serves as a support for the harvester. This axle carries a bracket 14 at its inner end which is formed with means for supporting a horizontal pivot pin 15. The pin 15 is in turn rigidly connected at its rear end to a vertical pivot pin 16 forming a T-shaped element. The pin 16 is journalled on a vertical axis in a bracket 17 connected to an extension of the axle 11. It is to be understood that the bracket 17 may be connected in any suitable manner to the thresher part of the machine. The forward end of the pin 15 is fitted into a slot formed in a laterally projecting portion of the bracket 17. Said pin may be secured in said slot by a key 17'. The axle 13 carries, by means of forwardly extending bars 18, the usual cutting platform 19 forming the harvester part of the machine. Said harvester part is provided with a cutting means and conveying means not shown as such elements are well known in the art and do not form a part of the present invention.

For supporting the grainward or outer end of the axle 13 and the harvester parts carried thereby, a wheel 20 is mounted at the outer end of the axle on a member 21 rigidly secured at the end of the axle. Said member has an integral arm 22 extending forwardly and laterally from the axle. The grain wheel 20 is pivotally attached to the arm 22 on a vertical axis by means of a supporting member 23. Said member has a vertical portion extending through a bearing formed in the arm 22, a horizontal portion extending rearwardly from the vertical portion, and a second horizontal portion extending laterally from the rear end of the first named horizontal portion. The hub 24 of the wheel is offset outwardly from the rim thereof and is journalled on the laterally extending portion of the member 23. This offset construction is provided so that the wheel, when free to pivot or swing, will maintain its longitudinal alignment with the pivot axis on the arm 22.

A brace bar 25, pivotally connected to a rearwardly located point on the main frame 10, extends laterally forwardly to the axle 13 at the outer end thereof. A member 26, adjustably clamped to the bar near its forward end, is provided with a downwardly extending stub shaft 27. Said shaft extends through a slot formed in a bracket 28 and is provided with a stop 29 at its outer end to retain it in the slot. The member 28 is secured to the same member 21 to which the caster wheel is pivoted. The member 28 is shaped with a portion spaced above the member 21 to provide for the slot in which the shaft 27 is mounted for reciprocation.

The bar 25 extends beyond the member 26 and is provided with a downwardly bent end portion 30 which clears the spokes of the wheel 20 and is in a position to engage the rearwardly extending horizontal portion of the support 23.

In the operation of a harvester thresher embodying the construction above described, draft is applied to the main frame 10 by a tractor or any suitable draft means. With the brace bar 25 in position, the axle 13 will, due to the offset construction of the harvester part of the machine, push rearwardly against the bar 25. As shown in Figure 3, the stub shaft 25 will be moved by this action to the forward outward end of the slot in the member 28. The bent down end 30 of the bar 25 will also be in the position shown in Figure 3, leaving the support 23 for the wheel free to swivel. The wheel can therefore be termed a caster wheel as it is free to oscillate within the range permitted during the operation of the harvester thresher in a forward direction.

When turning sharp corners and in certain other instances during the operation of a harvester thresher, it is necessary to back the machine somewhat; particularly when making a sharp right-hand turn it will be understood that the pivot action will take place somewhere adjacent the center of the machine with the result that the outer end of the harvester part will move rearwardly. When this action is taking place it is desirable to have the grain wheel in fixed position as otherwise it would swing around to such an extent that damage might be caused to the machine. The construction as previously described, provides for automatically locking the grain wheel in position when the harvester part of the machine is moved rearwardly. This action is accomplished by the construction of the brace bar 25, as will be understood by considering Figure 3. As soon as tension is applied to the bar 25, which might be brought about either by a sharp right turn or rearward draft pressure on the main frame 10, the shaft 27 is pulled rearwardly and inwardly along the slot in the member 28 until it reaches the rear end of the slot. The bent end 30 of the bar is also pulled inwardly, thereby engaging the rearwardly extending horizontal portion of the support 23 and holding the wheel 20 against pivoting movement. As soon as draft is again applied in a forward direction, an opposite movement of the shaft 27 and the bent end 30 takes place, thereby releasing the land wheel for pivoting or limited swiveling movement. It will be thereby understood that applicant has provided a draft actuated means for automatically locking the grain wheel when the harvester part of the machine is being moved in a rearward direction and for automatically releasing the wheel for pivoting movement when the draft is applied in a forward direction.

As shown in dotted lines in Figure 1, by removing the bar 25 the harvester part of the machine may be swung around to trailing position. The support 23 for the grain wheels swings around at right angles with respect to the arm 22 and forms a castering transport wheel which is very desirable for transporting the machine over uneven ground.

It is to be understood that applicant has shown and described a preferred embodiment of his improved grain and transport wheel for harvester threshers and that he claims as his invention all modifications falling within the scope of the appended claims.

What is claimed is:

1. In a machine of the class described, a main frame, a harvester connected thereto for folding movement rearwardly in a horizontal plane, a grain wheel positioned at the outer end of the harvester and pivotally connected thereto on a substantially vertical axis, and means for locking said wheel against swiveling movement when the harvester in its operative position is moved in a rearward direction.

2. In a machine of the class described, a main frame, a harvester connected thereto for folding movement rearwardly in a horizontal plane, a grain wheel positioned at the outer end of the harvester and pivotally connected thereto on a substantially vertical axis, and automatically operable means for locking said wheel against swiveling movement when the harvester in its operative position is moved in a rearward direction.

3. In a machine of the class described, a main frame, a harvester connected thereto for folding movement rearwardly in a horizontal plane, a grain wheel positioned at the outer end of the harvester and pivotally connected thereto on a substantially vertical axis, and draft actuated means for locking said wheel against swiveling movement when the harvester in its operative position is moved in a rearward direction.

4. In a thresher harvester of the class described, a support for the harvester, means connecting the support to the thresher for folding the harvester along side the thresher, a supporting wheel carried at the outer end of the harvester, said wheel being mounted to swing about a vertical axis when the harvester is being operated in a forward direction, and means operable by movement of the harvester in a rearward direction to lock said wheel against swinging movement.

5. In a thresher harvester of the class described, a support for the harvester, means connecting the support to the thresher for folding the harvester along side the thresher, a supporting wheel carried at the outer end of the harvester, said wheel being mounted to pivot about a substantially vertical axis when the harvester is being operated in a forward direction, and means automatically operable by movement of the harvester in a rearward direction to lock said wheel against pivoting movement.

6. In a thresher harvester of the class described, a support for the harvester, means connecting the support to the thresher for folding the harvester along side the thresher, a supporting wheel carried at the outer end of the harvester, said wheel being mounted to oscillate about a substantially vertical axis when the harvester is being operated in a forward direction, and draft actuated means operable by movement of the harvester in a rearward direction to lock said wheel against oscillation.

7. In a harvester thresher a main frame, a harvester including an axle floatingly and foldingly connected to the frame, a wheel supporting the outer end of the harvester, said wheel being pivotally connected to its support on a substantially vertical axis whereby castering action is obtained when the harvester is moving in a forward direction and when the harvester is folded, and means for locking the wheel against pivotal movement when the thresher is moved rearwardly with the harvester in operative position.

8. In a harvester thresher a main frame, a harvester including an axle floatingly and foldingly connected to the frame, a wheel supporting the outer end of the harvester, said wheel being pivotally connected to its support on a substantially vertical axis whereby castering action is obtained when the harvester is moving in a forward direction and when the harvester is folded, and means for automatically locking the wheel against pivotal movement when the thresher is moved rearwardly with the harvester in operative position.

9. In a harvester thresher a main frame, a harvester including an axle floatingly and foldingly connected to the frame, a wheel supporting the outer end of the harvester, said wheel being pivotally connected to its support on a substantially vertical axis whereby castering action is obtained when the harvester is moving in a forward direction and when the harvester is folded, and draft actuated means for locking the wheel against pivotal movement when the thresher is moved rearwardly with the harvester in operative position.

10. In a machine of the class described a main frame, a harvester including an axle laterally offset from the main frame and foldingly connected thereto for rearward and horizontal folding, an arm on the free end of the axle, a wheel pivotally mounted on said arm on a substantially vertical axis, and automatically operable means for preventing pivoting of the wheel about said axis when the harvester is moved rearwardly when in its normal offset position, said wheel being free to pivot when the harvester is in its folded position.

11. In a harvester thresher of the class described a main frame, a harvester pivotally connected to said frame for rearward and horizontal folding movement with respect thereto, a grain wheel pivotally mounted on a substantially vertical axis at the outer end of the platform, a brace connected to the main frame and extending adjacent the grain wheel, means providing for limited sliding movement af said brace with respect to the harvester, and means carried by said brace operative upon rearward movement of the main frame with the harvester in operative offset position to lock the grain wheel against pivoting movement.

In testimony whereof I affix my signature.

ALEXUS C. LINDGREN.